United States Patent
Nagahama (10) Patent No.: US 10,975,253 B2
(45) Date of Patent: *Apr. 13, 2021

(54) LIGHT-BLOCKING MEMBER, BLACK RESIN COMPOSITION, AND BLACK RESIN MOLDED ARTICLE

(71) Applicant: KIMOTO CO., LTD., Saitama (JP)

(72) Inventor: Tsuyoshi Nagahama, Saitama (JP)

(73) Assignee: KIMOTO CO., LTD., Saitama (JP)

( * ) Notice: Subject to any disclaimer, the term of this patent is extended or adjusted under 35 U.S.C. 154(b) by 138 days.

This patent is subject to a terminal disclaimer.

(21) Appl. No.: 15/573,614

(22) PCT Filed: May 17, 2016

(86) PCT No.: PCT/JP2016/064557
§ 371 (c)(1),
(2) Date: Nov. 13, 2017

(87) PCT Pub. No.: WO2016/186098
PCT Pub. Date: Nov. 24, 2016

(65) Prior Publication Data
US 2018/0118959 A1  May 3, 2018

(30) Foreign Application Priority Data

May 21, 2015 (JP) .............................. JP2015-103886

(51) Int. Cl.
*C09D 7/61* (2018.01)
*B32B 27/20* (2006.01)
(Continued)

(52) U.S. Cl.
CPC .................. *C09D 7/61* (2018.01); *B05D 5/06* (2013.01); *B32B 27/20* (2013.01); *C08K 3/04* (2013.01);
(Continued)

(58) Field of Classification Search
CPC . G02B 7/02; G02B 5/003; C09D 4/00; C09D 5/32; C09D 7/42; C09D 7/61; C09D 133/00–26
See application file for complete search history.

(56) References Cited

U.S. PATENT DOCUMENTS 4,222,835 A * 9/1980 Dixon ................... C08F 2/48
428/461
2006/0104084 A1  5/2006 Amemiya
(Continued)

FOREIGN PATENT DOCUMENTS

| CN | 10 3069316 A | 4/2013 |
| JP | H04-009802 A | 1/1992 |

(Continued)

OTHER PUBLICATIONS

Machine translation of JPH09-133806. Retrieved Dec. 17, 2019.*
(Continued)

*Primary Examiner* — Prashant J Khatri
(74) *Attorney, Agent, or Firm* — Bacon & Thomas, PLLC (57) ABSTRACT

Provided are a light-blocking member, a black resin composition, and a black resin molded article having excellent durability and solvent resistance, and the like. In a light-blocking member (1) comprising a substrate (11) and a light-blocking membrane (21) provided on at least one surface of this substrate (11), the light-blocking membrane (21) containing an ultraviolet curable resin as a binder resin and containing a black pigment as a filler dispersed in this binder resin is employed. The light-blocking membrane (21) preferably further contains photo- and/or thermal polymerization initiators. In addition, the content of the filler in the light-blocking membrane (21) is preferably 10% by mass or (Continued)

more and 60% by mass or less in terms of solids based on all resin components contained in the light-blocking membrane (21).

10 Claims, 1 Drawing Sheet

(51) Int. Cl.
| | |
|---|---|
| G02B 5/00 | (2006.01) |
| G02B 1/12 | (2006.01) |
| C09D 7/42 | (2018.01) |
| C08K 3/04 | (2006.01) |
| C09D 4/00 | (2006.01) |
| C09D 5/32 | (2006.01) |
| G02B 7/02 | (2021.01) |
| G03B 11/00 | (2021.01) |
| B05D 5/06 | (2006.01) |
| C08L 33/02 | (2006.01) |
| B05D 7/04 | (2006.01) |
| B05D 1/28 | (2006.01) |
| B05D 3/04 | (2006.01) |
| B05D 3/06 | (2006.01) |

(52) U.S. Cl.
CPC ............... *C08L 33/02* (2013.01); *C09D 4/00* (2013.01); *C09D 5/32* (2013.01); *C09D 7/42* (2018.01); *G02B 1/12* (2013.01); *G02B 5/003* (2013.01); *G02B 7/02* (2013.01); *G03B 11/00* (2013.01); *B05D 1/28* (2013.01); *B05D 3/0413* (2013.01); *B05D 3/067* (2013.01); *B05D 7/04* (2013.01); *B05D 2601/02* (2013.01); *C08K 2201/001* (2013.01)

(56) References Cited

U.S. PATENT DOCUMENTS

| | | |
|---|---|---|
| 2010/0226016 A1 | 9/2010 | Hirauchi et al. |
| 2011/0200810 A1* | 8/2011 | Kubota .................... G02B 1/04 428/220 |
| 2014/0011125 A1* | 1/2014 | Inoue ....................... C08K 3/28 430/7 |

FOREIGN PATENT DOCUMENTS

| | | |
|---|---|---|
| JP | H09-133806 A | 5/1997 |
| JP | 2003/266580 A | 9/2003 |
| JP | 2006-171701 A | 6/2006 |
| JP | 2006-235153 A | 9/2006 |
| JP | 2009-222791 A | 10/2009 |
| JP | 2010-534342 A | 11/2010 |
| JP | 2012-068630 A | 4/2012 |
| WO | 2006/016555 A1 | 2/2006 |

OTHER PUBLICATIONS

Schwalm et al. "Scratch resistance with UV and dual curable urethane acrylates". European Coatings Journal, (2003); pp. 1-6.*
International Search Report of International Application No. PCT/JP2016/064557, dated Aug. 2, 2016.

* cited by examiner

FIG. 1

LIGHT-BLOCKING MEMBER, BLACK RESIN COMPOSITION, AND BLACK RESIN MOLDED ARTICLE

TECHNICAL FIELD

The present invention relates to a light-blocking member, a black resin composition, and a black resin molded article.

BACKGROUND ART

Conventionally, in an optical apparatus such as a camera or a projector, the inner wall surfaces of a camera, and the like are composed of members having light-blocking properties to prevent the occurrence of halation and ghosts due to outside light, and the like. As such a light-blocking member, for example, a light-absorbing member in which a light-absorbing film comprising a black paint containing carbon black and having a predetermined surface shape is provided on a surface of a substrate film is known (see Patent Literature 1).

Also, members having light-blocking properties are used in the shutters, diaphragm members, lens units, and the like of various optical apparatuses such as single-lens reflex cameras, compact cameras, and video cameras. Further, in these light-blocking members, excellent slip properties (sliding properties) and low gloss are also needed because of their modes of use. Conventionally, metal thin films to which black paints are applied have been used as the shutters, diaphragm members, lens units, and the like of various optical apparatuses. However, in recent years, replacement by lightweight plastic materials has been studied.

As such a nonmetallic light-blocking member, a light-blocking member in which light-blocking membranes containing carbon black and a lubricant in a thermosetting resin or a room temperature curable resin are formed on both surfaces of a resin film is known (see Patent Literature 2). A light-blocking membrane in which light-blocking membranes containing carbon black, a lubricant such as polyethylene wax, silica fine particles having an amount of oil absorbed of 250 (g/100 g) or more, and a binder resin are formed on both surfaces of a resin film is also known (see Patent Literature 3).

CITATION LIST

Patent Literature

Patent Literature 1: Japanese Patent Laid-Open No. 2003-266580
Patent Literature 2: Japanese Patent Laid-Open No. 04-009802
Patent Literature 3: International Publication No. WO 2006/016555

SUMMARY OF INVENTION

Technical Problem

However, in the above conventional light-blocking membranes, it cannot be said that the durability (abrasion resistance) and the solvent resistance are sufficient, and further improvement is required. In addition, also for slip properties (sliding properties), similarly, further performance improvement is required. But, for example, in the conventional art, in one having an optical density of 5.4 or more, the filling rate of fillers such as carbon black, a lubricant, and silica fine particles is already in a saturated state, and more highly filling the fillers reaches a technical limit. Under such circumstances, for example, when a lubricant is highly filled in order to improve slip properties, the amounts of other fillers such as carbon black blended need to be reduced, and with such a design change, the light-blocking properties are impaired.

The present invention has been made in view of the above problem. Specifically, it is an object of the present invention to provide a light-blocking member, a black resin composition, and a black resin molded article having excellent durability and solvent resistance. It is a further object of the present invention to provide a light-blocking member, a black resin composition, and a black resin molded article having not only excellent durability and solvent resistance but also excellent slip properties and light-blocking properties.

Solution to Problem

The present inventors have studied diligently in order to solve the above problem. As a result, the present inventors have found that the above problem is solved by using an ultraviolet curable resin as a binder resin, arriving at the present invention.

Specifically, the present invention provides specific embodiments shown in the following (1) to (11).

(1) A light-blocking member comprising a substrate; and a light-blocking membrane provided on at least one surface of the substrate, wherein the light-blocking membrane contains at least a binder resin and a filler dispersed in the binder resin, the binder resin contains an ultraviolet curable resin, and the filler contains a black pigment.

(2) The light-blocking member according to the above (1), wherein the light-blocking membrane further contains photo- and/or thermal polymerization initiators.

(3) The light-blocking member according to the above (1) or (2), wherein a content of the filler in the light-blocking membrane is 10% by mass or more and 60% by mass or less in terms of solids based on all resin components contained in the light-blocking membrane.

(4) The light-blocking member according to any one of the above (1) to (3), wherein a content of the black pigment is 85% by mass or more and 100% by mass or less in terms of solids based on a total amount of the filler.

(5) The light-blocking member according to any one of above (1) to (4), wherein
the light-blocking membrane has a total thickness of 3 μm or more and less than 10 μm.

(6) The light-blocking member according to any one of above (1) to (5), wherein
the substrate is a sheet-shaped substrate, and
the light-blocking membranes are provided on one major surface and the other major surface of the sheet-shaped substrate.

(7) A black resin composition comprising at least a matrix resin and a filler dispersed in the matrix resin, wherein the matrix resin contains an ultraviolet curable resin, and the filler contains a black pigment.

(8) The black resin composition according to the above (7), further comprising photo- and/or thermal polymerization initiators.

(9) The black resin composition according to the above (7) or (8), wherein a content of the filler is 10% by mass or more and 60% by mass or less in terms of solids based on all resin components.

(10) The black resin composition according to any one of the above (7) to (9), wherein a content of the black pigment is 85% by mass or more and 100% by mass or less in terms of solids based on a total amount of the filler.

(11) A black resin molded article obtained by molding the black resin composition according to any one of above (7) to (10).

In the present invention, by employing the ultraviolet curable resin as the binder resin, the durability (abrasion resistance) and the solvent resistance are improved. Therefore, highly filling a lubricant for the improvement of slip properties is not essential, and the amount of the black pigment blended can be maintained at a relatively high level, and therefore the degradation of slip properties and light-blocking properties is suppressed. In addition, in a preferred mode of the present invention, the photo- and/or thermal polymerization initiators are further contained. In such a configuration, a stronger light-blocking membrane can be formed by light irradiation treatment and/or heat treatment during film formation, and therefore the durability and the solvent resistance can be further improved. In addition, in another preferred mode, the content of the filler is set relatively low, and therefore also by this, the durability and the solvent resistance can be further improved. Even in this case, by maintaining the use ratio of the black pigment based on the total amount of the filler relatively high, light-blocking properties can also be balanced at a high level.

Advantageous Effects of Invention

According to the present invention, a light-blocking member, a black resin composition, and a black resin molded article having excellent durability and solvent resistance can be provided. In addition, according to a preferred mode of the present invention, a light-blocking member, a black resin composition, and a black resin molded article having not only excellent durability and solvent resistance but also excellent slip properties and light-blocking properties can be provided. According to the present invention, the improvement of durability and solvent resistance can increase product life. In addition, the improvement of solvent resistance can also suppress the falling off of the coating film, discoloration, and the like during punching, and chemical cleaning performed before incorporation into a product, and the like and therefore also contributes to product yield improvement.

DESCRIPTION OF EMBODIMENTS

Embodiments of the present invention will be described in detail below with reference to the drawing. Positional relationships such as top, bottom, left, and right are based on the positional relationships shown in the drawing unless otherwise noted. The dimensional ratio in the drawing is not limited to the ratio shown. However, the following embodiments are illustrations for explaining the present invention, and the present invention is not limited to these and can be carried out by making any changes without departing from the spirit thereof. As used herein, for example, the description of the numerical value range "1 to 100" encompasses both the upper limit value "1" and the lower limit value "100". The same applies to the description of other numerical value ranges.

Figure 1:
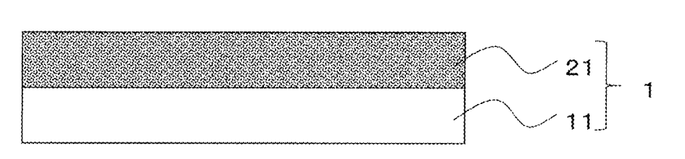
FIG. 1 is a diagram schematically showing the main part of a light-blocking member 1 in a first embodiment.

FIG. 1 is a diagram schematically showing the main part of a light-blocking member 1 in the first embodiment of the present invention. The light-blocking member 1 in this embodiment comprises a substrate 11 and a light-blocking membrane 21 (a light-blocking film 21) provided on at least one surface of this substrate 11. The light-blocking membrane 21 contains at least a binder resin and a filler dispersed in this binder resin. The light-blocking member 1 in this embodiment is characterized by containing an ultraviolet curable resin and a black pigment as the binder resin and the filler contained in the light-blocking membrane 21.

The components of the light-blocking member 1 will be described in detail below.

The type of the substrate 11 is not particularly limited as long as it can support the light-blocking membrane 21. Specific examples of the substrate 11 include, but are not particularly limited to, paper, synthetic paper, metal sheets, alloy sheets, metal foil, synthetic resin films, and laminates thereof. The substrate 11 may or may not have adhesiveness to the light-blocking membrane 21. The substrate 11 having no adhesiveness to the light-blocking membrane 21 can be allowed to function as a release film. From the viewpoint of dimensional stability, mechanical strength, weight reduction, and the like, synthetic resin films are preferably used. Examples of the synthetic resin films include polyester films, ABS (acrylonitrile-butadiene-styrene) films, polyimide films, polystyrene films, and polycarbonate films. Acrylic, polyolefin-based, cellulosic, polysulfone-based, polyphenylene sulfide-based, polyethersulfone-based, and polyetheretherketone-based films can also be used. Among these, as the substrate 11, polyester films are preferably used. Especially, stretched, particularly biaxially stretched, polyester films have excellent mechanical strength and dimensional stability and therefore are particularly preferred. For heat-resistant applications, polyimide films are particularly preferred. Here, the appearance of the substrate 11 may be any of transparent, semitransparent, and opaque appearance and is not particularly limited. For example, foamed synthetic resin films such as foamed polyester films, and synthetic resin films in which black pigments such as carbon black and other pigments are contained can also be used. When being much thinner and high light-blocking properties are needed, the optical density of the entire light-blocking member 1 can also be reinforced by using the substrate 11 having high optical density.

The thickness of the substrate 11 can be appropriately set according to the required performance and the application and is not particularly limited. Generally, 1 µm or more and less than 250 µm is considered as a rough standard. Here, from the viewpoint of the strength and rigidity of the light-blocking member 1, and the like, 51 µm or more and less than 250 µm is preferred, and from the viewpoint of weight reduction and film thinning, 1 µm or more and 50 µm or less is preferred. In the light-blocking member 1 in this embodiment, the optical density in terms of thickness (ODt) of the light-blocking membrane 21 is especially increased, and therefore the light-blocking member 1 having, for example, a total thickness of 60 µm or less, preferably a total thickness of 35 µm or less, further preferably a total thickness of 15 µm or less, and particularly preferably a total thickness of 10 µm or less can be realized while various types of performance such as light-blocking properties are maintained even if both the substrate 11 and the light-blocking membrane 21 are set as thin films. Therefore, in applications where film thinning is particularly required, the thickness of the substrate 11 is more preferably 1 µm or more and 25 µm or less, further preferably 4 µm or more and 10

μm or less, and particularly preferably 5 μm or more and 7 μm or less. From the viewpoint of improving adhesiveness to the light-blocking membrane 21, the surface of the substrate 11 can also be subjected to various known surface treatments such as anchor treatment and corona treatment as needed.

The light-blocking membrane 21 is provided on at least one surface of the above-described substrate 11 and contains at least an ultraviolet curable resin and a black pigment. In FIG. 1, a mode in which the light-blocking membrane 21 is provided on only one major surface (upper surface) of the sheet-shaped substrate 11 is shown, but the light-blocking membranes 21 may be provided on one major surface (upper surface) of and the other major surface (lower surface) of the sheet-shaped substrate 11 respectively. By providing the light-blocking membranes 21 on both the upper surface and lower surface of the sheet-shaped substrate 11, the handling properties of the light-blocking member 1 are increased.

The light-blocking membrane 21 contains, as the binder resin, an ultraviolet curable resin as an essential component. As this ultraviolet curable resin, photopolymerizable prepolymers that can be crosslinked and cured by irradiation with ultraviolet rays can be used. For example, acrylic prepolymers that have two or more acryloyl groups in one molecule and form a three-dimensional network structure by crosslinking and curing are preferably used. Examples of the acrylic prepolymers include, but are not particularly limited to, urethane acrylates, polyester acrylates, epoxy acrylates, melamine acrylates, polyfluoroalkyl acrylates, and silicone acrylates. One ultraviolet curable resin can be used alone, and two or more ultraviolet curable resins can also be used in combination. The above-described acrylic prepolymer can also be used alone, but a polymerizable monomer may be used in combination in order to provide various types of performance such as improving crosslinking and curing properties.

Examples of the above polymerizable monomer include, but are not particularly limited to, monofunctional acrylic monomers such as 2-ethylhexyl acrylate, 2-hydroxyethyl acrylate, 2-hydroxypropyl acrylate, and butoxyethyl acrylate; bifunctional acrylic monomers such as 1,6-hexanediol diacrylate, neopentyl glycol diacrylate, diethylene glycol diacrylate, polyethylene glycol diacrylate, and hydroxypivalate neopentyl glycol diacrylate; and polyfunctional acrylic monomers such as dipentaerythritol hexaacrylate, trimethylpropane triacrylate, and pentaerythritol triacrylate. One of these can be used alone, and two or more of these can also be used in combination.

The content of the ultraviolet curable resin in the light-blocking membrane 21 is not particularly limited but is preferably 40 to 90% by mass, more preferably 50 to 85% by mass, and further preferably 60 to 80% by mass in terms of solids based on the total amount of the light-blocking membrane 21 (phr). By setting the content of the ultraviolet curable resin in the above preferred range, physical properties such as the adhesiveness between the substrate 11 and the light-blocking membrane 21 and the durability, solvent resistance, light-blocking properties, surface glossiness (delustering properties), and slip properties of the light-blocking membrane 21 can be balanced at a high level. In addition, it is also possible to improve the scratch resistance of the formed light-blocking membrane 21 and prevent the light-blocking membrane 21 from becoming brittle.

On the other hand, the black pigment contained in the light-blocking membrane 21 colors the ultraviolet curable resin black to provide light-blocking properties. Examples of the black pigment used here include, but are not particularly limited to, black resin particles, titanium black, magnetite-based black, copper-iron-manganese-based black, titanium black, and carbon black. Among these, black resin particles, titanium black, and carbon black are preferred because of excellent concealing properties, and carbon black is more preferred. As the carbon black, conductive carbon black is particularly preferably used from the viewpoint of providing conductivity to the light-blocking membrane 21 to prevent electrostatic charging. The history of carbon black is old, and various grades of carbon black simple substances and carbon black dispersions are commercially available from, for example, Mitsubishi Chemical Corporation, Asahi Carbon Co., Ltd., MIKUNI COLOR LTD., RESINO COLOR INDUSTRY CO., LTD., Cabot, and DEGUSSA. The carbon black should be appropriately selected from among these according to the required performance and the application. One of these can be used alone, and two or more of these can also be used in combination.

From the viewpoint of efficiently increasing the light-blocking properties of the light-blocking membrane 21, two black pigments having different average particle diameters are preferably used as the black pigment contained in the light-blocking membrane 21. By using two large and small black pigments in this manner, the light-blocking membrane 21 in which the voids between the particles of the large black pigment are densely filled with the small black pigment, and the light-blocking properties with respect to the total amount of the black pigments filled are increased can be obtained. More specifically, it is preferred that a first black pigment having an average particle diameter $D_{50}$ of 0.4 to 2.5 μm and a second black pigment having an average particle diameter $D_{50}$ of 0.01 to 0.3 μm are used in combination. Further, the average particle diameter $D_{50}$ of the first black pigment is more preferably 0.5 to 1.5 μm from the viewpoint of keeping surface glossiness low, improving slip properties, and the like. In addition, the average particle diameter $D_{50}$ of the second black pigment is more preferably 0.08 to 0.2 μm from the viewpoint of obtaining dispersibility and sufficient light-blocking properties, and the like. The average particle diameter herein means a median diameter ($D_{50}$) measured by a laser diffraction particle size distribution measuring apparatus (for example, SHIMADZU CORPORATION: SALD-7000). When two large and small black pigments are used in this manner, the content of the first black pigment and the black pigment is not particularly limited but is preferably 20:80 to 95:5, more preferably 30:70 to 80:20, and further preferably 40:60 to 70:30 in a mass ratio in terms of solids from the viewpoint of the balance of light-blocking properties, surface glossiness, and slip properties. The light-blocking membrane 21 may contain a black pigment other than the above-described first and second black pigments.

The content of all black pigments in the light-blocking membrane 21 is not particularly limited but is preferably 10% by mass or more and 60% by mass or less, more preferably 15% by mass or more and 50% by mass or less, and further preferably 20% by mass or more and 40% by mass or less in terms of solids based on all resin components contained in the light-blocking membrane 21 (phr). By setting the content of the black pigment in the above preferred range, physical properties such as the adhesiveness between the substrate 11 and the light-blocking membrane 21 and the durability, solvent resistance, light-blocking properties, surface glossiness, and slip properties of the light-blocking membrane 21 can be balanced at a high level.

The light-blocking membrane 21 may contain, as the binder resin, another resin other than the above-described ultraviolet curable resin. Examples of these other resins include, but are not particularly limited to, thermoplastic resins or thermosetting resins such as poly(meth)acrylic acid-based resins, polyester-based resins, polyvinyl acetate-based resins, polyvinyl chloride-based resins, polyvinyl butyral-based resins, cellulosic resins, polystyrene/polybutadiene resins, polyurethane-based resins, alkyd resins, acrylic resins, unsaturated polyester-based resins, epoxy ester-based resins, epoxy-based resins, epoxy acrylate-based resins, urethane acrylate-based resins, polyester acrylate-based resins, polyether acrylate-based resins, phenolic resins, melamine-based resins, urea-based resins, and diallyl phthalate-based resins. Thermoplastic elastomers, thermosetting elastomers, and the like can also be used. One of these can be used alone, and two or more of these can also be used in combination.

In addition, when the above-described ultraviolet curable resin is used, photo- and/or thermal polymerization initiators are preferably further contained in the light-blocking membrane 21. By containing the photo- and/or thermal polymerization initiators, the light-blocking membrane 21 that is stronger can be formed by light irradiation treatment and/or heat treatment during film formation, and therefore the durability and the solvent resistance can be further improved.

The photopolymerization initiator should be a substance that is cleaved to produce a radical by irradiation with ultraviolet rays having a wavelength that can trigger a polymerization reaction, and the type of the photopolymerization initiator is not particularly limited. Examples of the photopolymerization initiator include photopolymerization initiators such as aromatic ketones, aromatic ketals, metallocene compounds, oxime esters, carbonyl compounds, and thioxanthones. More specific examples include, but are not particularly limited to, acetophenone, benzil, benzophenone, Michler's ketone, benzoin, benzil methyl ketal, benzoyl benzoate, α-acyloxime esters, and thioxanthones. One of these can be used alone, and two or more of these can also be used in combination.

The thermal polymerization initiator should be a substance that is cleaved to produce a radical by heating, and the type of the thermal polymerization initiator is not particularly limited. Examples of the thermal polymerization initiator include thermal polymerization initiators such as organic halides, organic peroxides, onium salt compounds, and azo compounds. Among these, azo compounds are preferably used. Examples of the azo compounds include, but are not particularly limited to, azonitrile compounds, azoamide compounds, cyclic azoamidine compounds, and azoamidine compounds. For example, 2,2'-azobis(2,4,4-trimethylpentane), 4,4'-azobis(4-cyanopentanoic acid), 1,1'-azobis(1-acetoxy-1-phenylethane), 1,1'-azobis(methyl 1-cyclohexanecarboxylate), 4,4'-azobis(2-(perfluorobutyl)ethyl 4-cyanopentanoate), 4,4'-azobis(2-(trifluoromethyl)ethyl 4-cyanopentanoate), 4,4'-azobis(2-(perfluorohexyl)ethyl 4-cyanopentanoate), and azobisacetoxyphenylethane can also be used. One of these can be used alone, and two or more of these can also be used in combination.

The content of the photo- and/or thermal polymerization initiators is not particularly limited but is preferably 1.0 to 15% by mass, more preferably 3.0 to 10% by mass, in total in terms of solids based on all resin components contained in the light-blocking membrane 21. By setting the content of the photo- and/or thermal polymerization initiators in the above preferred range, the light-blocking membrane 21 in which the adhesiveness between the substrate 11 and the light-blocking membrane 21, the durability and solvent resistance of the light-blocking membrane 21, and the like are much better is easily obtained.

Further, the light-blocking membrane 21 particularly preferably contains the thermal polymerization initiator and the photopolymerization initiator. By using the polymerization initiators in combination in this manner, the control of the degrees of cure of the film surface and film interior of the light-blocking membrane 21 becomes easy by thermal curing using the thermal polymerization initiator and photocuring using the photopolymerization initiator, and the adjustment of the strength, surface glossiness, slip properties, and the like of the obtained light-blocking membrane 21 becomes easy. When the polymerization initiators are used in combination in this manner, the blending ratio between the thermal polymerization initiator and the photopolymerization initiator is not particularly limited but is preferably 10:90 to 70:30, more preferably 20:80 to 60:40, and further preferably 30:70 to 50:50. For the curing treatment during film formation, heat treatment and light irradiation treatment may be sequentially performed, or both treatments may be performed at the same time. From the viewpoint of the ease of the adjustment of the strength, surface glossiness, slip properties, and the like of the obtained light-blocking membrane 21, heat treatment is preferably performed prior to light irradiation treatment. In this case, the light irradiation treatment may be performed after the heat treatment, or the light irradiation treatment may be performed after the heat treatment while the heat treatment is further continuously performed.

The light-blocking membrane 21 may contain a polymerization accelerator together with the above-described photo- and/or thermal polymerization initiators. Here, the polymerization accelerator can reduce polymerization hindrance due to air during curing and increase curing speed. Specific examples of the polymerization accelerator include, but are not particularly limited to, isoamyl p-dimethylaminobenzoate ester and ethyl p-dimethylaminobenzoate ester. One of these can be used alone, and two or more of these can also be used in combination.

In addition, the light-blocking membrane 21 may contain a lubricant in addition to the ultraviolet curable resin, the black pigment, and the photo- and/or thermal polymerization initiators described above. By containing the lubricant, the slip properties (sliding properties) of the surface of the light-blocking membrane 21 improve, and the frictional resistance during operation decreases when it is processed into the shutter, diaphragm member, lens unit, or the like of an optical apparatus, and the abrasion resistance of the surface can be improved. As this lubricant, organic lubricants and inorganic lubricants known as known particulate lubricants can be used. Among these, liquid lubricants are preferred. Specific examples include, but are not particularly limited to, hydrocarbon-based lubricants such as polyethylene, paraffins, and waxes; fatty acid-based lubricants such as stearic acid and 12-hydroxystearic acid; amide-based lubricants such as stearic acid amide, oleic acid amide, and erucic acid amide; ester-based lubricants such as butyl stearate and monoglyceryl stearate; alcohol-based lubricants; solid lubricants such as metal soaps, talc, and molybdenum disulfide; silicone resin particles, polytetrafluoroethylene waxes, fluororesin particles such as polyvinylidene fluoride; crosslinked polymethyl methacrylate particles, and crosslinked polystyrene particles. Among these, particularly organic lubricants are preferably used. One of these can be used alone, and two or more of these can also be used in combination.

The content of the lubricant is not particularly limited but is generally preferably 0.5 to 10% by mass in terms of solids based on all resin components contained in the light-blocking membrane 21. In this embodiment, the fact that the light-blocking membrane 21 comprises substantially no lubricant is also one of preferred modes. By providing a lubricantless mode in this manner, the relative content of the ultraviolet curable resin and the black pigment in the light-blocking membrane 21 can be increased. This can suppress decreases in light-blocking properties and conductivity and slip properties and further can also contribute to the improvement of the adhesiveness, durability, and solvent resistance of the light-blocking membrane 21. Comprising substantially no lubricant means that the content of the lubricant is less than 0.5% by mass in terms of solids based on all resin components contained in the light-blocking membrane 21, and the content of the lubricant is more preferably less than 0.1% by mass.

In addition, the light-blocking membrane 21 may contain a matting agent (flatting agent). By containing the matting agent, the glossiness (specular glossiness) of the surface of the light-blocking membrane 21 can be decreased, and the light-blocking properties can be improved. As this matting agent, known ones can be used. Specific examples include, but are not particularly limited to, organic fine particles such as crosslinked acrylic beads, and inorganic fine particles such as silica, magnesium aluminometasilicate, and titanium oxide. Among these, silica is preferred from the viewpoint of dispersibility, cost, and the like. One of these can be used alone, and two or more of these can also be used in combination.

The content of the matting agent is not particularly limited but is generally preferably 0.5 to 20% by mass in terms of solids based on all resin components contained in the light-blocking membrane 21. In this embodiment, the fact that the light-blocking membrane 21 comprises substantially no matting agent is one of preferred modes. By providing a matting-agent-less mode in this manner, the relative content of the ultraviolet curable resin and the black pigment in the light-blocking membrane 21 can be increased. This can suppress decreases in light-blocking properties and conductivity and slip properties and further can also contribute to the improvement of the adhesiveness and solvent resistance of the light-blocking membrane 21. Comprising substantially no matting agent means that the content of the matting agent is less than 0.5% by mass in terms of solids based on all resin components contained in the light-blocking membrane 21, and the content of the matting agent is more preferably less than 0.1% by mass.

In addition, the light-blocking membrane 21 may further contain other components. Examples of these other components include, but are not particularly limited to, conductive agents such as $SnO_2$, flame retardants, antimicrobial agents, fungicides, antioxidants, plasticizers, leveling agents, flow-adjusting agents, antifoaming agents, and dispersing agents. In addition, when the photopolymerization initiator is used, for example, a sensitizer such as n-butylamine, triethylamine, or tri-n-butylphosphine, and an ultraviolet absorbing agent may be used.

On the other hand, the thickness of the light-blocking membrane 21 can be appropriately set according to the required performance and the application and is not particularly limited. In applications where thickness is allowed, the thickness of the light-blocking membrane 21 should be sufficient, and thus the light-blocking membrane 21 in which the content of all black pigments in the light-blocking membrane 21 is significantly reduced can be realized. In such applications, the total thickness of the light-blocking membrane 21 is preferably 10 μm or more and 60 μm or less, more preferably 10 μm or more and 40 μm or less. On the other hand, in applications where particularly film thinning is required, the total thickness of the light-blocking membrane 21 is preferably 3 μm or more and less than 10 μm, more preferably 4 μm or more and 9 μm or less, and further preferably 5 μm or more and 8 μm or less. Here, the total thickness of the light-blocking membrane 21 means, when the light-blocking membrane 21 is provided on only one major surface of the substrate 11, the thickness of the light-blocking membrane 21 and means, when the light-blocking membranes 21 are provided on both surfaces (one major surface and the other major surface) of the substrate 11, a value obtained by adding the thicknesses of the light-blocking membranes 21 on both surfaces.

Here, the above described light-blocking membrane 21 preferably has an optical density in terms of thickness (ODt) of 0.54 to 2.00 ($\mu m^{-1}$), more preferably 0.55 to 2.00 ($\mu m^{-1}$), further preferably 0.80 to 1.80 ($\mu m^{-1}$), particularly preferably 0.90 to 1.50 ($\mu m^{-1}$), especially preferably 0.91 to 1.40 ($\mu m^{-1}$), and most preferably 0.92 to 1.20 ($\mu m^{-1}$). When the optical density in terms of thickness (ODt) is in the above preferred range, the light-blocking membrane 21 that is highly thinned while having sufficient optical density (OD) can be realized.

The light-blocking membrane 21 preferably has a surface glossiness of 5.0% or less. When the surface glossiness is low in this manner, the reflection of incident light decreases, and the flatting properties when the light-blocking member 1 is formed tend to improve to increase light absorption properties. The surface glossiness of the light-blocking membrane 21 is more preferably 4.0% or less.

The light-blocking member 1 in this embodiment preferably has an optical density (OD) of 5.4 to 6.0, more preferably 5.5 to 6.0, from the viewpoint of being adaptable to further film thinning and having sufficient light-blocking properties. As used herein, the optical density (OD) is a value measured under conditions described in Examples described later.

The method for manufacturing the light-blocking member 1 in this embodiment is not particularly limited as long as the light-blocking member 1 having the above-described configuration and composition is obtained. From the viewpoint of forming the light-blocking membrane 21 with good reproducibility, simply, and at low cost, conventionally known application methods such as doctor coating, dip coating, roll coating, bar coating, die coating, blade coating, air knife coating, kiss coating, spray coating, and spin coating are preferably used. By subjecting a coating film applied in this manner to ultraviolet irradiation treatment, and heat treatment, pressurization treatment, and the like as needed, the light-blocking membrane 21 can be formed on the substrate 11. More specifically, the light-blocking membrane 21 can be formed on the substrate 11 by applying an application liquid for a light-blocking membrane, which contains, in a solvent, the ultraviolet curable resin and the black pigment described above and optional components (photo- and/or thermal polymerization initiators, a lubricant, a matting agent, other components, and the like) blended as needed, to one surface or both surfaces of the substrate 11, drying the application liquid, then performing ultraviolet irradiation treatment, and further performing heat treatment, pressurization treatment, and the like as needed. As the solvent of the application liquid used here, water; ketone-based solvents such as methyl ethyl ketone, methyl isobutyl ketone, and cyclohexanone; ester-based solvents such as methyl acetate, ethyl acetate, and butyl acetate; ether-based solvents such as methyl cellosolve and ethyl cellosolve;

alcohol-based solvents such as methyl alcohol, ethyl alcohol, and isopropyl alcohol, and mixed solvents thereof, and the like can be used. In addition, in order to improve the adhesion between the substrate 11 and the light-blocking membrane 21, the surface of the substrate 11 can also be subjected to anchor treatment, corona treatment, and the like as needed. Further, an intermediate layer such as an adhesion layer can also be provided between the substrate 11 and the light-blocking membrane 21 as needed.

Here, the light source used in the ultraviolet irradiation treatment is not particularly limited as long as it is a light source that generates ultraviolet rays. For example, low pressure mercury lamps, medium pressure mercury lamps, high pressure mercury lamps, ultrahigh pressure mercury lamps, carbon arc lamps, metal halide lamps, and xenon lamps can be used. In addition, the ultraviolet irradiation conditions can be appropriately set according to the type and output performance of the light source used, and the like and is not particularly limited. For the dose of ultraviolet rays, generally, an accumulated amount of light of about 1000 to 6000 mJ/cm$^2$ is considered as a rough standard, and 2000 to 5000 mJ/cm$^2$ is preferred.

The heat source used in the heat treatment is also not particularly limited. Either of a contact type and a noncontact type can be preferably used. For example, far infrared heaters, short wavelength infrared heaters, medium wavelength infrared heaters, carbon heaters, ovens, and heat rollers can be used. The treatment temperature in the heat treatment is not particularly limited but is generally 100 to 200° C., preferably 120 to 190° C., and more preferably 130° C. to 180° C.

As described in detail above, in the light-blocking member 1 in this embodiment, the durability and the solvent resistance are improved without the slip properties and the light-blocking properties being excessively impaired, and therefore the light-blocking member 1 in this embodiment can be preferably used as a light-blocking member having long life, for example, in the precision machine field, the semiconductor field, and the optical apparatus field. In addition, because of excellent slip properties and durability, the light-blocking member 1 in this embodiment can be especially preferably used as a light-blocking member, for example, a shutter, a diaphragm member, or a lens unit, for an optical apparatus such as a high-performance single-lens reflex camera, a compact camera, a video camera, a cellular phone, or a projector.

In the above embodiment, a mode in which the light-blocking membrane 21 is provided on the substrate 11 is shown, but the present invention can also be carried out in a mode in which the substrate 11 is omitted. For example, the present invention can be effectively carried out as a resin composition (black resin composition) containing at least a matrix resin and a filler dispersed in this matrix resin, the resin composition containing an ultraviolet curable resin as the matrix resin and containing a black pigment as the filler. As the matrix resin used here, the same as those described for the ultraviolet curable resin and the another resin in the above first embodiment can be used. In addition, as the black pigment, the same as those described in the above first embodiment can be used. This black resin composition has the same composition as the light-blocking membrane 21 described in the above embodiment and therefore has excellent durability and solvent resistance. Therefore, by molding the black resin composition by various known molding methods such as ultraviolet curing molding, heat molding, compression molding, injection molding, blow molding, transfer molding, and extrusion molding, a molded article (black resin molded article) having excellent durability and solvent resistance can be obtained. After the black resin composition is once molded into a sheet shape, vacuum forming, pressure forming, or the like can also be performed.

EXAMPLES

The present invention will be described in detail below by giving Examples and Comparative Examples, but the present invention is not limited in any way by these Examples. The present invention can employ various conditions as long as the object of the present invention is achieved without departing from the spirit of the present invention. "Parts" indicates "parts by mass" and "phr" indicates "% by mass in terms of solids based on all resin components" contained in a light-blocking membrane unless otherwise noted below.

Example 1

The application liquid for a light-blocking membrane E1 set forth below was applied to each of both surfaces of a polyester film having a thickness of 6 μm (K200: Mitsubishi Polyester Film Corporation) as a substrate by a bar coating method so that the thickness after drying was 3 μm, and dried. Then, heat treatment at 150° C. was performed using a circulating hot air dryer, and then UV irradiation treatment (accumulated amount of light: 1000 mJ/cm$^2$) was performed using a high pressure mercury lamp, to form a light-blocking membrane having a thickness of 3 μm on each of both surfaces of the substrate to fabricate a light-blocking member for an optical apparatus in Example 1.

<Application Liquid for Light-Blocking Membrane E1>

| | |
|---|---|
| Urethane acrylate (Resin 1700BA: manufactured by The Nippon Synthetic Chemical Industry Co., Ltd., solids: 90%) | 100 parts by mass |
| First black pigment (Conductive carbon black SD-TT2003: manufactured by RESINO COLOR INDUSTRY CO., LTD., average particle diameter 0.6 μm) | 10.1 phr |
| Second black pigment (Conductive carbon black #273: manufactured by MIKUNI COLOR LTD., average particle diameter 0.15 μm) | 9.9 phr |
| Leveling agent (Silicone-based additive M-ADDITIVE: manufactured by Dow Corning Toray Co., Ltd.) | 0.2% by mass based on the total amount of solids |
| Azo polymerization initiator | 5.0 parts by mass |
| Oxime ester-based photopolymerization initiator | 3.0 parts by mass |
| Diluting solvent (Mixed solvent of MEK:butyl acetate = 54:46) | 100 parts by mass |

Example 2

Operation was performed as in Example 1 except that in the application liquid for a light-blocking membrane E1, the amounts of the first and second black pigments blended were changed to 7.6 phr and 7.4 phr respectively. Thus, a light-blocking member for an optical apparatus in Example 2 was fabricated.

Example 3

Operation was performed as in Example 1 except that in the application liquid for a light-blocking membrane E1, the amounts of the first and second black pigments blended were changed to 15.1 phr and 14.9 phr respectively. Thus, a light-blocking member for an optical apparatus in Example 3 was fabricated.

Comparative Example 1

Operation was performed as in Example 1 except that the application liquid for a light-blocking membrane CE1 set forth below was used instead of the above application liquid for a light-blocking membrane E1, and the heat treatment and the UV irradiation treatment were omitted. Thus, a light-blocking member for an optical apparatus in Comparative Example 1 was fabricated.

<Application Liquid for Light-Blocking Membrane CE1>

| | |
|---|---|
| Acrylic polyol (ACRYDIC A801P: manufactured by Dainippon Ink and Chemicals, Incorporated, solids: 50%) | 100 parts by mass |
| Isocyanate (TAKENATE D110N: manufactured by Mitsui Chemicals Polyurethanes, Inc., solids: 60%) | 22.7 parts by mass |
| Conductive nanoparticle carbon black (Vulcan XC-72R: manufactured by Cabot, average primary particle diameter 30 nm, aggregated particle diameter 0.4 μm) | 23.16 phr |
| Matting agent (Silica fine particles Acematt_TS100: manufactured by EVONIK, average particle diameter 10 μm) | 5.6 phr |
| Leveling agent (Silicone-based additive M-ADDITIVE: manufactured by Dow Corning Toray Co., Ltd.) | 0.1% by mass based on the total amount of solids |
| Diluting solvent (Mixed solvent of MEK:toluene:butyl acetate = 4:3:3) | 100 parts by mass |

Comparative Example 2

Operation was performed as in Comparative Example 1 except that the application liquid for a light-blocking membrane CE2 set forth below was used instead of the application liquid for a light-blocking membrane CE1. Thus, a light-blocking member for an optical apparatus in Comparative Example 2 was fabricated.

<Application Liquid for Light-Blocking Membrane CE2>

| | |
|---|---|
| Acrylic polyol (ACRYDIC A801P: manufactured by Dainippon Ink and Chemicals, Incorporated, solids: 50%) | 100 parts by mass |
| Isocyanate (TAKENATE D110N: manufactured by Mitsui Chemicals Polyurethanes, Inc., solids: 60%) | 25.0 parts by mass |
| Conductive nanoparticle carbon black (Vulcan XC-72R: manufactured by Cabot, average primary particle diameter 30 nm, aggregated particle diameter 0.4 μm) | 40.00 phr |
| Leveling agent (Silicone-based additive M-ADDITIVE: manufactured by Dow Corning Toray Co., Ltd.) | 0.05% by mass based on the total amount of solids |
| Diluting solvent (Mixed solvent of MEK:toluene:butyl acetate = 4:3:3) | 100 parts by mass |

Comparative Example 3

Operation was performed as in Comparative Example 2 except using an application liquid for a light-blocking membrane CE3 in which 5.6 phr of the matting agent used in Comparative Example 1 was blended into the application liquid for a light-blocking membrane CE2. Thus, a light-blocking member for an optical apparatus in Comparative Example 3 was fabricated.

For the light-blocking members for optical apparatuses in Examples 1 to 3 and Comparative Examples 1 to 3 obtained, the measurement and evaluation of physical properties were performed under the following conditions. The evaluation results are shown in Table 1.

(1) Durability (Abrasion Resistance)

Each of the light-blocking members for optical apparatuses in Examples 1 to 3 and Comparative Examples 1 to 3 obtained was used as the diaphragm member of a camera and operated 1,000,000 times, and the presence or absence of the abrasion and peeling of the coating film surface was examined. Here, one having no abrasion or peeling was evaluated as "⊚", one having some abrasion or peeling but having no problem with use was evaluated as "○", and one that could not be used was evaluated as "x".

(2) Solvent Resistance

A rug in which methyl ethyl ketone was contained was reciprocated 20 times on the light-blocking membrane, and the change in the light-blocking membrane was examined. One having no change was evaluated as "⊚", one having some change but having no problem with use was evaluated as "○", and one that could not be used was evaluated as "x".

(3) Optical Density OD

For the measurement of optical density, the optical density was measured based on JIS-K7651: 1988 using an optical densitometer (TD-904: GretagMacbeth). In the measurement, a UV filter was used.

(4) Optical Density in Terms of Thickness ODt

Optical density was divided by film thickness to calculate optical density per thickness of 1 μm ODt ($\mu m^{-1}$).

(5) Surface Glossiness

The surface glossiness (specular glossiness) (%) of the light-blocking membrane surface at incidence and acceptance angles of 60° was measured in accordance with JIS-Z8741: 1997 using a digital variable angle glossmeter (UGV-5K: Suga Test Instruments Co., Ltd.). It is noted that the lower the glossiness is, the better the flatting properties are.

(6) Evaluation of Slip Properties

The static friction coefficient (μs) and kinetic friction coefficient (μk) of the light-blocking membrane were measured under the conditions of a load of 200 (g) and a speed of 100 (mm/min) in accordance with JIS-K7125: 1999, and each was evaluated according to the following criteria.

Static Friction Coefficient (μs)

| | |
|---|---|
| less than 0.30 | ⊚ |
| 0.30 or more and less than 0.35 | ○ |
| 0.35 or more and less than 0.40 | Δ |
| 0.40 or more | X |

Kinetic Friction Coefficient (μk)

| | |
|---|---|
| 0.30 or more and less than 0.35 | ⊚ |
| 0.35 or more and less than 0.40 | ○ |
| 0.40 or more | X |

TABLE 1

| | Binder resin | Thermal polymerization initiator | Photo-polymerization initiator | Durability | Solvent resistance | Optical density | Optical density in terms of thickness ($\mu m^{-1}$) | Surface glossiness (%) | Slip properties Static friction | Slip properties Kinetic friction |
|---|---|---|---|---|---|---|---|---|---|---|
| Example 1 | Ultraviolet curable resin | Contained | Contained | ⊚ | ⊚ | 6.0 | 1.00 | 2.8 | ⊚ | ⊚ |
| Example 2 | Ultraviolet curable resin | Contained | Contained | ⊚ | ⊚ | 5.5 | 0.92 | 3.0 | ⊚ | ⊚ |
| Example 3 | Ultraviolet curable resin | Contained | Contained | ○ | ○ | 6.0 | 1.00 | 2.5 | ⊚ | ⊚ |
| Comparative Example 1 | Isocyanate curable acrylic resin | — | — | X | X | 5.1 | 0.51 | 3.0 | Δ | X |
| Comparative Example 2 | Isocyanate curable acrylic resin | — | — | X | X | 5.3 | 0.92 | 10.0 | ⊚ | ⊚ |
| Comparative Example 3 | Isocyanate curable acrylic resin | — | — | X | X | 5.5 | 0.95 | 2.5 | Δ | X |

As shown in Table 1, in the light-blocking member for an optical apparatus in Comparative Example 1 having a conventionally formulation, the durability and the solvent resistance were poor. In addition, the optical density in terms of thickness (ODt) of the light-blocking membrane is as low as 0.51, and the light-blocking properties as basic performance are also insufficient. Further, due to the matting agent blended for keeping surface glossiness low, the slip properties also deteriorate.

In addition, in the light-blocking member for an optical apparatus in Comparative Example 2 in which a black pigment is highly filled in order to improve the optical density OD, the light-blocking properties and the slip properties improve with respect to Comparative Example 1, but the durability and the solvent resistance are still poor, and further, the surface glossiness deteriorates. One in which a matting agent is further blended in order to improve this deterioration of surface glossiness is Comparative Example 3. In the light-blocking member for an optical apparatus in this Comparative Example 3, due to the blending of the matting agent, the surface glossiness can be kept low, but on the other hand the durability and the solvent resistance are still poor, and the slip properties are greatly impaired.

In contrast to this, it is understood that in all of the light-blocking members for optical apparatuses in Examples 1 to 3 of the present invention, the durability and the solvent resistance are improved. In addition, from the comparison of Examples 1 to 3, it is seen that when the content of the black pigments is reduced, the durability and the solvent resistance tend to improve further. Further, it is seen that the light-blocking members for optical apparatuses in Examples 1 to 3 also have high performance for light-blocking properties, surface glossiness, and slip properties. It is understood that especially, regarding surface glossiness and slip properties, excellent performance is shown although no matting agent or slipping agent is used. From the above, it was confirmed that in the light-blocking members for optical apparatuses in Examples 1 to 3 of the present invention, while extreme film thinning, a film thickness of 3 μm on one surface, was achieved, the durability and the solvent resistance were improved without the light-blocking properties, the surface glossiness, and the slip properties being excessively impaired.

Example 4

Operation was performed as in Example 1 except that the application liquid for a light-blocking membrane E4 as set forth was used instead of the application liquid for a light-blocking membrane E1 and applied to each of both surfaces of the substrate so that the thickness after drying was 5 μm on one surface. Thus, a light-blocking member for an optical apparatus in Example 4 was fabricated.

<Application Liquid for Light-Blocking Membrane E4>

| | |
|---|---|
| Urethane acrylate (Resin 1700BA: manufactured by The Nippon Synthetic Chemical Industry Co., Ltd., solids: 90%) | 100 parts by mass |
| black pigment (Conductive carbon black SD-TT2003: manufactured by RESINO COLOR INDUSTRY CO., LTD., average particle diameter 0.6 μm) | 30.0 phr |
| Leveling agent (Silicone-based additive M-ADDITIVE: manufactured by Dow Corning Toray Co., Ltd.) | 0.2% by mass based on the total amount of solids |
| Azo polymerization initiator | 5.0 parts by mass |
| Oxime ester-based photopolymerization initiator | 3.0 parts by mass |
| Diluting solvent (Mixed solvent of MEK:butyl acetate = 54:46) | 100 parts by mass |

Example 5

Operation was performed as in Example 1 except that an application liquid for a light-blocking membrane E5 in which in the application liquid for a light-blocking membrane E4, the amount of the black pigment blended was changed to 40.0 phr was used and applied to each of both surfaces of the substrate so that the thickness after drying was 4 μm on one surface. Thus, a light-blocking member for an optical apparatus in Example 5 was fabricated.

TABLE 2

| | Binder resin | Thermal polymerization initiator | Photopolymerization initiator | Durability | Solvent resistance | Optical density | Optical density in terms of thickness ($\mu m^{-1}$) | Surface glossiness (%) | Slip properties Static friction | Kinetic friction |
|---|---|---|---|---|---|---|---|---|---|---|
| Example 4 | Ultraviolet curable resin | Contained | Contained | ◎ | ◎ | 5.5 | 0.55 | 10.0 | ◎ | ◎ |
| Example 5 | Ultraviolet curable resin | Contained | Contained | ◎ | ◎ | 5.7 | 0.71 | 8.0 | ◎ | ◎ |

As shown in Table 2, it is understood that in all of the light-blocking members for optical apparatuses in Examples 4 to 5 of the present invention, the durability and the solvent resistance are improved. In addition, it is seen that the light-blocking members for optical apparatuses in Examples 4 to 5 also have sufficient performance for light-blocking properties, surface glossiness, and slip properties. It is understood that especially, regarding slip properties, excellent performance is shown although no matting agent or slipping agent is used. From the above, it was confirmed that in the light-blocking members for optical apparatuses in Examples 4 to 5 of the present invention, the durability and the solvent resistance were improved without the light-blocking properties, the surface glossiness, and the slip properties being excessively impaired.

INDUSTRIAL APPLICABILITY

The present invention can be widely and effectively utilized as a light-blocking member having long life and excellent solvent resistance in the precision machine field, the semiconductor field, the optical apparatus field, and the like. In addition, one also having excellent slip properties and light-blocking properties can also be realized, and therefore the present invention can be especially preferably used as a light-blocking member, for example, a shutter, a diaphragm member, or a lens unit, for an optical apparatus such as a high-performance single-lens reflex camera, a compact camera, a video camera, a cellular phone, or a projector.

REFERENCE SIGNS LIST

1 Light-blocking member
11 Substrate
21 Light-blocking membrane

The invention claimed is:

1. A light-blocking member comprising a substrate; and a light-blocking membrane provided on one major surface of the substrate and on another major surface of the substrate, wherein
the light-blocking membranes comprise at least a binder resin, a filler dispersed in the binder resin, a photo-polymerization initiator, and a thermal-polymerization initiator, the binder resin contains an ultraviolet curable urethane acrylate resin, and the filler contains a black pigment,
the light-blocking membranes have a total thickness of 3 $\mu m$ or more and less than 10 $\mu m$, the black pigment includes a first black pigment and a second black pigment, the second black pigment has an average particle diameter D50 of 0.01 to 0.3 $\mu m$, and
a content the filler in the light-blocking membrane is 10% by mass or more and 60% by mass or less in terms of solids based on all resin components in the light-blocking member, and the static friction coefficient of the light-blocking membrane is less than 0.35 ($\mu s$) and/or the kinetic friction coefficient of the light-blocking membrane is less than 0.40 ($\mu k$).

2. The light-blocking member according to claim 1, wherein the first black pigment has an average particle diameter $D_{50}$ of 0.4 to 2.5 $\mu m$.

3. The light-blocking member according to claim 2, wherein a content of the black pigment is 85% by mass or more and 100% by mass or less in terms of solids based on a total amount of the filler.

4. The light-blocking member according to claim 2, wherein
the substrate is a sheet-shaped substrate, and
the light-blocking membranes are provided on one major surface and the other major surface of the sheet-shaped substrate.

5. The light-blocking member according to claim 1, wherein the blending ratio between the thermal-polymerization initiator and the photo-polymerization initiator is 10:90 to 70:30.

6. The light-blocking member according to claim 5, wherein
the substrate is a sheet-shaped substrate, and
the light-blocking membranes are provided on one major surface and the other major surface of the sheet-shaped substrate.

7. The light-blocking member according to claim 5, wherein a content of the black pigment is 85% by mass or more and 100% by mass or less in terms of solids based on a total amount of the filler.

8. The light-blocking member according to claim 1, wherein a content of the black pigment is 85% by mass or more and 100% by mass or less in terms of solids based on a total amount of the filler.

9. The light-blocking member according to claim 8, wherein
the substrate is a sheet-shaped substrate, and
the light-blocking membranes are provided on one major surface and the other major surface of the sheet-shaped substrate.

10. The light-blocking member according to claim 1, wherein
the substrate is a sheet-shaped substrate, and
the light-blocking membranes are provided on one major surface and the other major surface of the sheet-shaped substrate.

* * * * *